(12) United States Patent
Bhabhrawala (10) Patent No.: US 9,567,907 B2
(45) Date of Patent: Feb. 14, 2017

(54) IMAGING ASSISTED GAS TURBINE ANTI-ICING SYSTEM (71) Applicant: General Electric Company, Schenectady, NY (US)

(72) Inventor: Talib S. Bhabhrawala, Houston, TX (US)

(73) Assignee: General Electrical Company, Schenectady, NY (US)

(*) Notice: Subject to any disclaimer, the term of this patent is extended or adjusted under 35 U.S.C. 154(b) by 164 days.

(21) Appl. No.: 14/630,234

(22) Filed: Feb. 24, 2015

(65) Prior Publication Data
US 2016/0245178 A1 Aug. 25, 2016

(51) Int. Cl.
| | |
|---|---|
| G06F 19/00 | (2011.01) |
| F02C 7/057 | (2006.01) |
| H04N 7/18 | (2006.01) |
| G08B 21/20 | (2006.01) |
| G06T 7/00 | (2006.01) |
| G08B 21/18 | (2006.01) |
| F02C 7/047 | (2006.01) |
| B64D 15/20 | (2006.01) |
| F01D 25/02 | (2006.01) |

(52) U.S. Cl.
CPC ............ *F02C 7/057* (2013.01); *B64D 15/20* (2013.01); *F01D 25/02* (2013.01); *F02C 7/047* (2013.01); *G06T 7/001* (2013.01); *G08B 21/182* (2013.01); *G08B 21/20* (2013.01); *H04N 7/183* (2013.01); *G06T 2207/30164* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 4,783,026 A | 11/1988 | Rumford et al. | |
| 5,180,122 A | 1/1993 | Christian et al. | |
| 5,423,174 A | 6/1995 | Mouton | |
| 6,961,445 B1 | 11/2005 | Jensen et al. | |
| 7,874,137 B2 | 1/2011 | Chaney et al. | |
| 8,429,891 B2 | 4/2013 | Bryant | |
| 8,844,258 B2 | 9/2014 | Ekanayake et al. | |

(Continued)

FOREIGN PATENT DOCUMENTS

| | | |
|---|---|---|
| EP | 2592447 A1 | 5/2013 |
| GB | 2250967 A | 6/1992 |

OTHER PUBLICATIONS

European Search Report issued in connection with corresponding EP Application No. 16156817.5 on Jul. 19, 2016.

(Continued)

*Primary Examiner* — Adam Alharbi
(74) *Attorney, Agent, or Firm* — Fletcher Yoder P.C.

(57) ABSTRACT

A method includes receiving image data from a camera coupled to an air intake system of a gas turbine engine. The image data corresponds to an air passage of the air intake system. The method also includes comparing the received image data to reference image data of the air intake system. The method also includes generating an icing notification based at least in part on the comparison when a difference between the received image data and reference image data is greater than an icing threshold.

20 Claims, 7 Drawing Sheets (56) References Cited

U.S. PATENT DOCUMENTS

2005/0056786 A1* 3/2005 Shepard ................ G01N 25/72
            250/341.4
2009/0273776 A1* 11/2009 Bittner ................ G01R 33/283
            356/240.1
2013/0192197 A1 8/2013 Feulner et al.
2014/0356122 A1 12/2014 Hatcher, Jr. et al.
2015/0033698 A1 2/2015 Cuevas et al.

OTHER PUBLICATIONS

Loud, R.L. and Slaterpryce, A.A., "Gas Turbine Inlet Treatment," pp. 15 and 16, GER-3419A, GE Reference Library, Jun. 1991.

* cited by examiner

IMAGING ASSISTED GAS TURBINE ANTI-ICING SYSTEM

BACKGROUND

The subject matter disclosed herein relates to gas turbine systems, and, more particularly, to an anti-icing system for a gas turbine engine.

Gas turbine systems generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. Gas turbine systems may be exposed to various environmental conditions. For example, a gas turbine system may operate in cold ambient temperature and high humidity that may cause ice formation at various locations on or within the gas turbine system (e.g., an inlet). Ice formation and accumulation may adversely affect performance of the gas turbine system and/or damage components (e.g., compressor blades) of the gas turbine system.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a method includes receiving image data from a camera coupled to an air intake system of a gas turbine engine. The image data corresponds to an air passage of the air intake system. The method also includes comparing the received image data to reference image data of the air intake system. The method also includes generating an icing notification based at least in part on the comparison when a difference between the received image data and reference image data is greater than an icing threshold.

In a second embodiment, a system includes a controller. The controller includes one or more tangible, non-transitory, machine-readable media collectively storing one or more sets of instructions. The controller also includes one or more processing devices configured to execute the one or more sets of instructions to receive image data from a camera coupled to an air intake system of a gas turbine engine. The image data corresponds to an air passage of the air intake system. The one or more processing devices is also configured to execute the one or more sets of instructions to compare the received image data to reference image data of the air intake system, and to generate an icing notification based at least in part on the comparison when a difference between the received image data and reference image data is greater than an icing threshold.

In a third embodiment, a system includes a gas turbine engine including an air intake system. The air intake system includes an air passage. The system also includes a camera coupled to the air intake system and configured to image the air passage of the air intake system. The system also includes a controller communicatively coupled to the camera and configured to receive image data from the camera. The image data corresponds to the air passage. The controller is also configured to compare the received image data to reference image data of the air intake system, and to generate an icing notification based at least in part on the comparison when a difference between the received image data and reference image data is greater than an icing threshold.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As noted above, a gas turbine engine may be exposed to various environmental conditions, such as cold ambient temperature and high humidity that may cause ice formation at various locations on or within the gas turbine engine (e.g., an inlet for air intake). For example, ice may form in an icing range that may be generally described as ambient temperature of less than approximately 4.4° C. (i.e., 40° F.) with a relative humidity greater than approximately 65%. Due to temperature depression at the inlet (e.g., a bellmouth passage of the air intake system) caused by flow acceleration into the gas turbine engine, the ambient temperature can be above freezing (e.g., 0° C.), yet still at risk of ice formation. Certain techniques have been adopted to prevent ice formation on or within the gas turbine engine, especially at the inlet (e.g., air passage) of the gas turbine engine. For example, when the ambient air has a temperature between approximately −9.4° C. (i.e., 15° F.) and 4.4° C. (i.e., 40° F.) and a relative humidity about 65%, air entering the gas turbine engine (e.g., at the inlet) may be heated (e.g., by a heat coil, a heat exchanger, a relatively warmer air stream, or the like) to at least approximately 4.4° C. (i.e., 40° F.) or at least 5.5° C. (i.e., 10° F.) warmer than the ambient temperature. The extra 5.5° C. (i.e., 10° F.) may drive the air temperature high enough so that the combination of temperature and humidity will no longer be in the icing range. However, it is now recognized that ice may not actually form in some conditions within the icing range. Thus, there may be parasitic loss in engine power (e.g., used for heating the air entering the gas turbine engine at the inlet when there is no actual ice formation) in the existing anti-icing techniques.

The disclosed embodiments are directed to systems and methods for computationally assisted visual detection of actual ice formation at locations (e.g., an inlet) in a gas turbine engine. In according to one aspect of the present disclosure, one or more cameras may be set up about an air passage (e.g., inlet) of the gas turbine engine to obtain images and/or videos of the air passage. The one or more cameras may be borescope cameras for minimum intrusion into the air flow path. The images and/or videos may be transmitted to a control system for processing. The control system may utilize any suitable method (e.g., edge detection) to process the images and/or videos to detect actual ice formation at the inlet. If actual ice formation is detected, the control system may notify an operator (e.g., via an alarm) and/or control an anti-icing system (e.g., a heat coil, a heat exchanger, a mixing device, or the like) to reduce or eliminate the ice formed at the inlet. The control system may also control the anti-icing to stop once the actual ice formation is eliminated (e.g., as confirmed by the one or more cameras). Because the anti-icing system may operate only when actual ice formation exists in accordance with the present disclosure, parasitic loss of engine power and/or auxiliary power may be reduced, and performance of the gas turbine engine and/or the plant may be improved.

Figure 1:
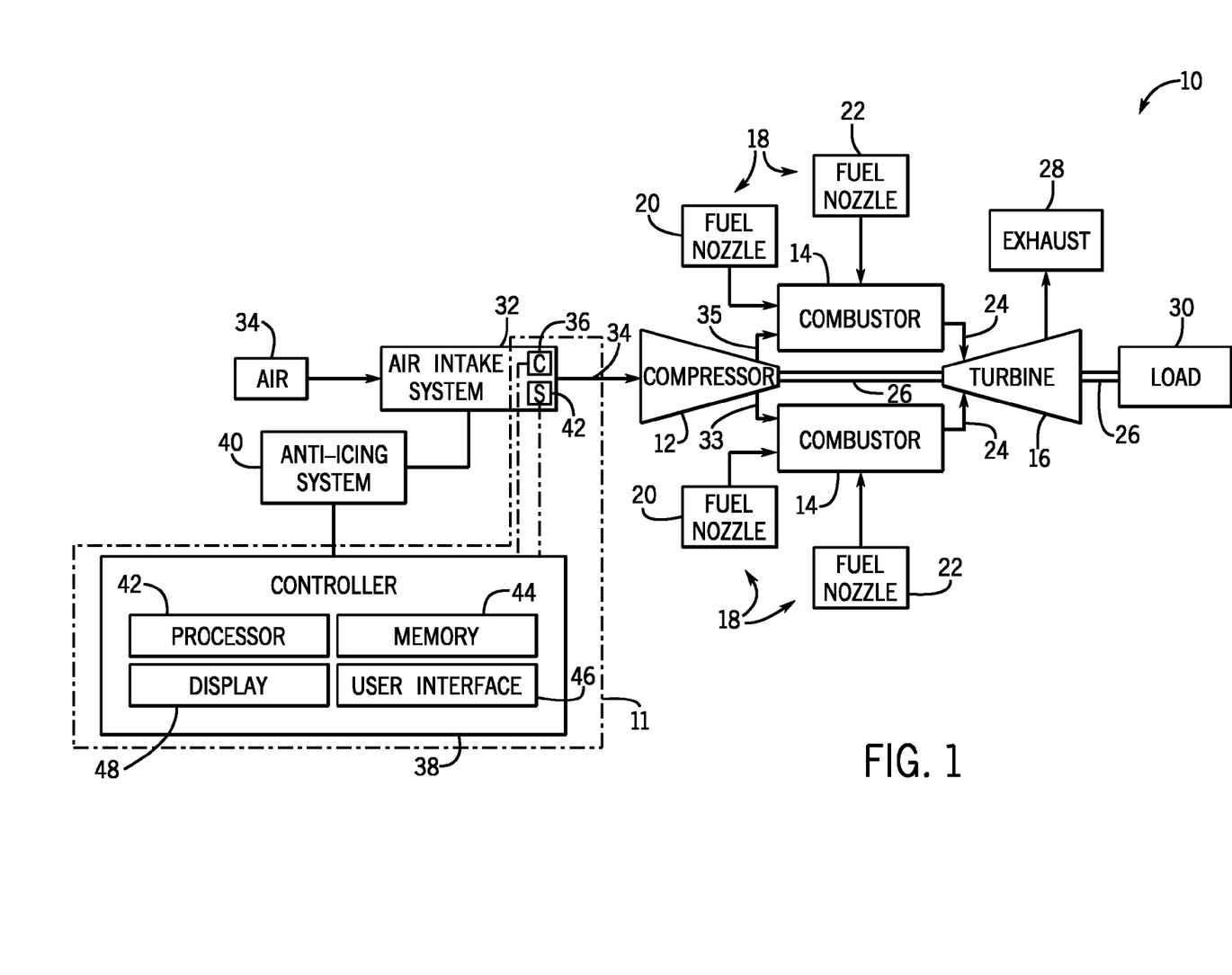
FIG. 1 is a schematic diagram of an embodiment of a gas turbine engine system including an ice detection system, in accordance with the present disclosure.

Turning now to the drawings, FIG. 1 is a block diagram of an embodiment of a gas turbine system 10 including an ice detection system 11, in accordance with the present disclosure. The gas turbine system 10 includes a compressor 12, turbine combustors 14, and a turbine 16. The turbine combustors 14 include fuel nozzles 18 which route a liquid fuel and/or gas fuel, such as natural gas or syngas, into the turbine combustors 14. As shown, each turbine combustor 14 may have multiple fuel nozzles 18. More specifically, the turbine combustors 14 may each include a primary fuel injection system having primary fuel nozzles 20 and a secondary fuel injection system having secondary fuel nozzles 22.

The turbine combustors 14 ignite and combust an air-fuel mixture, and then pass hot pressurized combustion gasses 24 (e.g., exhaust) into the turbine 16. Turbine blades are coupled to a shaft 26, which is also coupled to several other components throughout the gas turbine system 10. As the combustion gases 24 pass through the turbine blades in the turbine 16, the turbine 16 is driven into rotation, which causes the shaft 26 to rotate. Eventually, the combustion gases 24 exit the turbine system 10 via an exhaust outlet 28. Further, the shaft 26 may be coupled to a load 30, which is powered via rotation of the shaft 26. For example, the load 30 may be any suitable device that may generate power via the rotational output of the turbine system 10, such as a power generation plant or an external mechanical load. For instance, the load 30 may include an electrical generator, a propeller of an airplane, and so forth.

In an embodiment of the gas turbine system 10, compressor blades are included as components of the compressor 12. The blades within the compressor 12 are coupled to the shaft 26, and will rotate as the shaft 26 is driven to rotate by the turbine 16, as described above. An air intake system 32 may draw air 34 from the ambient environment into the gas turbine system 10. The rotation of the blades within the compressor 12 causes compression of air 34 from the air intake system 32, thereby creating pressurized air 35. The pressurized air 35 is then fed into the fuel nozzles 18 of the combustors 14. The fuel nozzles 18 mix the pressurized air 35 and fuel to produce a suitable mixture ratio for combustion (e.g., a combustion that causes the fuel to more completely burn) so as not to waste fuel or cause excess emissions.

The ice detection system 11, in accordance with the present disclosure, may be coupled to various locations (e.g., the air intake system 32, the compressor 12) of the gas turbine system 10 for detecting actual ice formation. In the illustrated embodiment, the ice detection system 11 is coupled to the air intake system 32. As will be discussed in greater detail below, the ice detection system 11 may include one or more cameras 36 disposed in various locations of the air intake system 32. The one or more cameras 36 are configured to image the various locations of the air intake system 32. The images obtained by the one or more cameras 36 may be transmitted (e.g., via wired, wireless communication, or a combination thereof) to a controller 38 for processing. The controller 38 may utilize any suitable techniques or algorithms to process the images to determine if there is actual ice formed in the air intake system 32. If the controller 38 determines that there is actual ice formation, the controller 38 may control an anti-icing system 40 to reduce or eliminate the ice in the air intake system 40. During the period when the anti-icing system 40 is operating, the one or more cameras 36 may continue to image the various locations of the air intake system 32 and transmit the images to the controller 38. When the controller 38 determines from the images that the ice in the air intake system 32 has been reduced (e.g., to a threshold) or eliminated, the controller 38 may control the anti-icing system 40 to stop.

In addition to the one or more cameras 36, the ice detection system 11 may also include one or more ice detectors 42 disposed at various locations of the air intake system 32. The one or more ice detectors 42 may be any suitable type of ice detector, including an optical transducer, an acoustic sensor, or a nuclear sensor. The one or more ice detectors 42 may be supplementary to the one or more cameras 36 and may facilitate confirming formation of the actual ice in the air intake system 32. Signals detected by the one or more ice detectors 42 may also be transmitted (e.g., via wired, wireless communication, or a combination thereof) to the controller 38 for processing to determine whether there is actual ice formed in the air intake system 32.

The anti-icing system 40 may be any suitable system configured to reduce or eliminate formed ice. For example, the anti-icing system 40 may include one or more heating devices (e.g., electric coil, heat exchanger) coupled to the air intake system 32 and configured to provide direct and/or indirect heat to the air entering the air intake system 32. The heat source provided to the heating devices may include, but is not limited to, resistance heating, inductive heating, a heat pump, hot water or steam, bleed air from the compressor 12, a portion of the turbine exhaust 28, or a portion of gas turbine enclosure ventilation air. The anti-icing system 40 may include one or more control devices (e.g., regulating valves, actuators) controllable by the controller 38 to control various parameters (e.g., temperature, pressure, flow rate, and the like) of the heat medium (e.g., water, steam, air, exhaust, or the like) within in the anti-icing system 40 (e.g., the heating devices and the related piping).

The controller 38 may include a processor 42 and a memory 44. The processor 42 may be any general purpose or application-specific processor. The memory 44 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by a processor (e.g., the processor 42) or by any general purpose or special purpose computer or other machine with a processor (e.g., the processor 42). The controller 38 may also include other components, such as a user interface 46 and a display 48. Via the user interface 46, an operator may provide commands and operational parameters to the controller 38 to control various aspects of the operation of the gas turbine system 10 (e.g., the one or more cameras 36). The user interface 46 may include a mouse, a keyboard, a touch screen, a writing pad, or any other suitable input and/or output devices. The display 48 may be configured to display any suitable information of the gas turbine system 10, such as the various operational parameters of the gas turbine system 10, the images obtained by the one or more cameras 36, and so forth.

Figure 2:
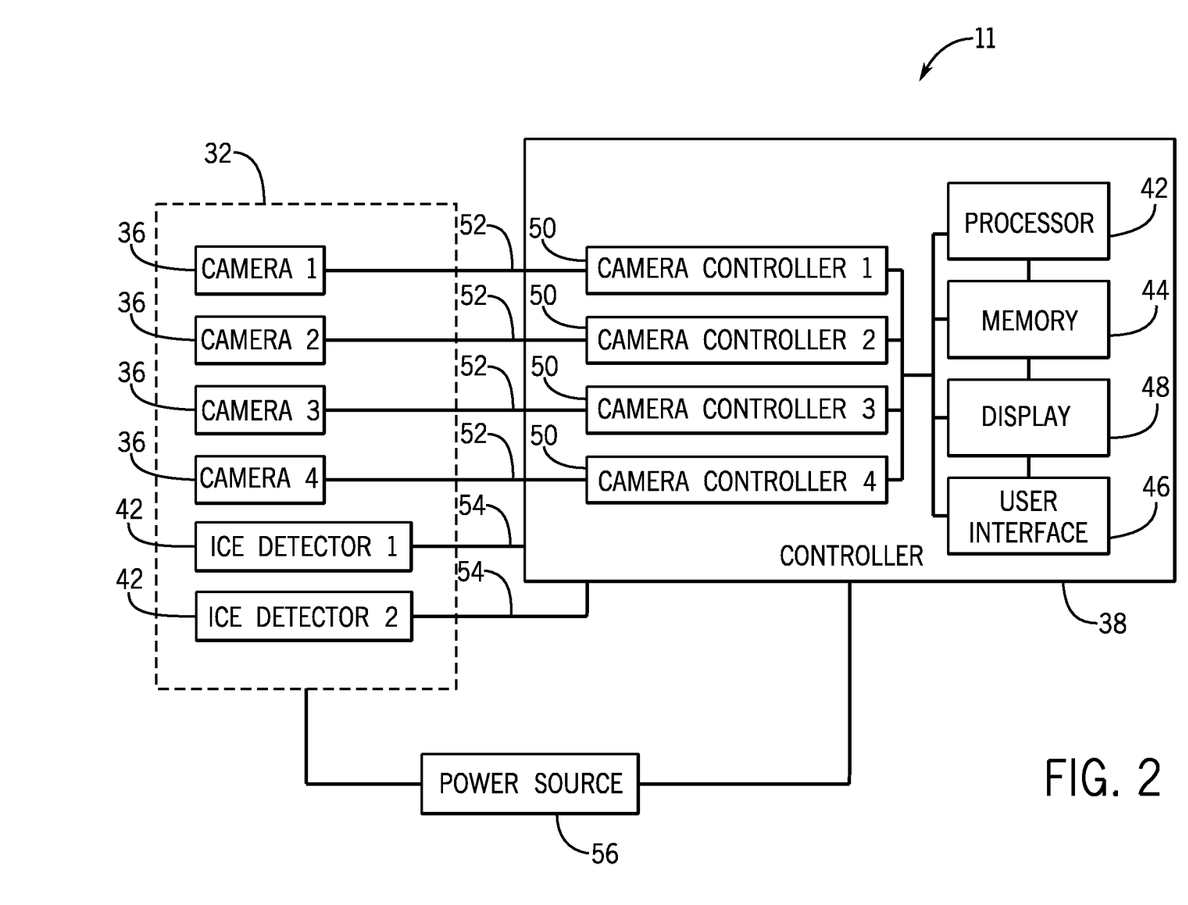
FIG. 2 is a schematic diagram of an embodiment of the ice detection system of FIG. 1, in accordance with the present disclosure.

FIG. 2 is a schematic diagram of an embodiment of the ice detection system 11 in accordance with the present disclosure. In the illustrated embodiment, the ice detection system 11 may include four cameras 36 disposed in the air intake system 32. However, it should be noted that the ice detection system 11 may include any number of the cameras 36, such as 1, 2, 3, 4, 5, 6, 7, 8, 9, or more. Also, as discussed in greater detail below, the four cameras 36 may be disposed in various locations of the air intake system 32. Alternatively or additionally, the cameras 36 may be disposed in various locations of other components of the gas turbine system 10, such as the compressor 12. Each of the four cameras 36 may be any type of camera suitable for imaging. In some embodiments, the cameras 36 are borescope cameras, thereby minimizing intrusion to the air intake system 32. In certain embodiments, the cameras 36 may include wide angle lens to provide enhanced viewing ability, such as enhanced imaging area coverage.

Each of the cameras 36 may be communicatively coupled to the controller 38. In the illustrated embodiment, each camera 36 is independently coupled to a camera controller 50 of the controller 38 (e.g., via respective communication signals 52). The communication signals 52 may be transmitted between each camera 36 and its respective camera controller 50 in any suitable manner (e.g., via wired, wireless communication, or a combination thereof). The communication signals 52 may include images and other related data from each camera 36 to the respective camera controller 50, and control signals from each camera controller 50 to the respective camera 36 for controlling operations (e.g., motions, zooming, focusing, and the like) of the camera 36. While in the illustrated embodiment, each camera 36 is independently coupled to the respective camera controller 50, in some embodiments, multiple cameras 36 may be coupled to one camera controller 50.

The camera controllers 50 may be communicatively coupled to other components of the controller 38, such as the processor 42, the memory 44, the display 48, and the user interface 46. For example, the camera controllers 50 may be controlled by the processor 42 (e.g., for controlling operations of the cameras 36) and the memory 44 (e.g., with stored instructions for operations of the cameras 36). Additionally or alternatively, the camera controllers 50 may be controlled by an operator via the user interface 46 (e.g., with commands from the operator). The images and related data obtained by the cameras 36 may be transmitted, via the camera controllers 50, to the display 48 for display, to the memory 48 for storage, and/or to the processor 42 for processing (e.g., for determining the actual ice formation, as discussed in greater detail below). In certain embodiments, the functionality carried out by the camera controllers 50 may be carried out by other components of the controller 38 (e.g., the processor 42, the memory 44), thereby eliminating the camera controllers 50. In embodiments where the camera controllers 50 are included in the controller 38, the camera controllers 50 may be separate from the controller 38 (e.g., disposed in separate rooms, housings, or instruments), or may be integrated with the controller 38 (e.g., together within an integrated enclosure).

In the illustrated embodiment, the ice detection system 11 also includes two ice detectors 42. Similarly, the ice detection system 11 may include any number of ice detectors 42, such as 0, 1, 2, 3, 4, 5, 6, 7, 8, 9, or more. The ice detectors 42 may be disposed in the air intake system 32 or any other suitable locations of the gas turbine system 10. The ice detectors 42 may be communicatively coupled to the controller 38 via communication signals 54 in any suitable manner (e.g., via wired, wireless communication, or a combination thereof). The communication signals 54 may include signals from the ice detectors 42 (e.g., indicating the formation of actual ice and/or type of ice) to the controller 38 and may be stored (e.g., by the memory 44) and processed (e.g., by the processor 42).

The cameras 36, the ice detectors 42, and the controller 38 may be powered by any suitable power source 56, including a battery, an electric outlet, a generator, or the like. The power source 56 may include various outputs (e.g., 110 V, 12 V) suitable for providing power separately and/or combined to the cameras 36, the ice detectors 42, and the controller 38.

Figure 3:
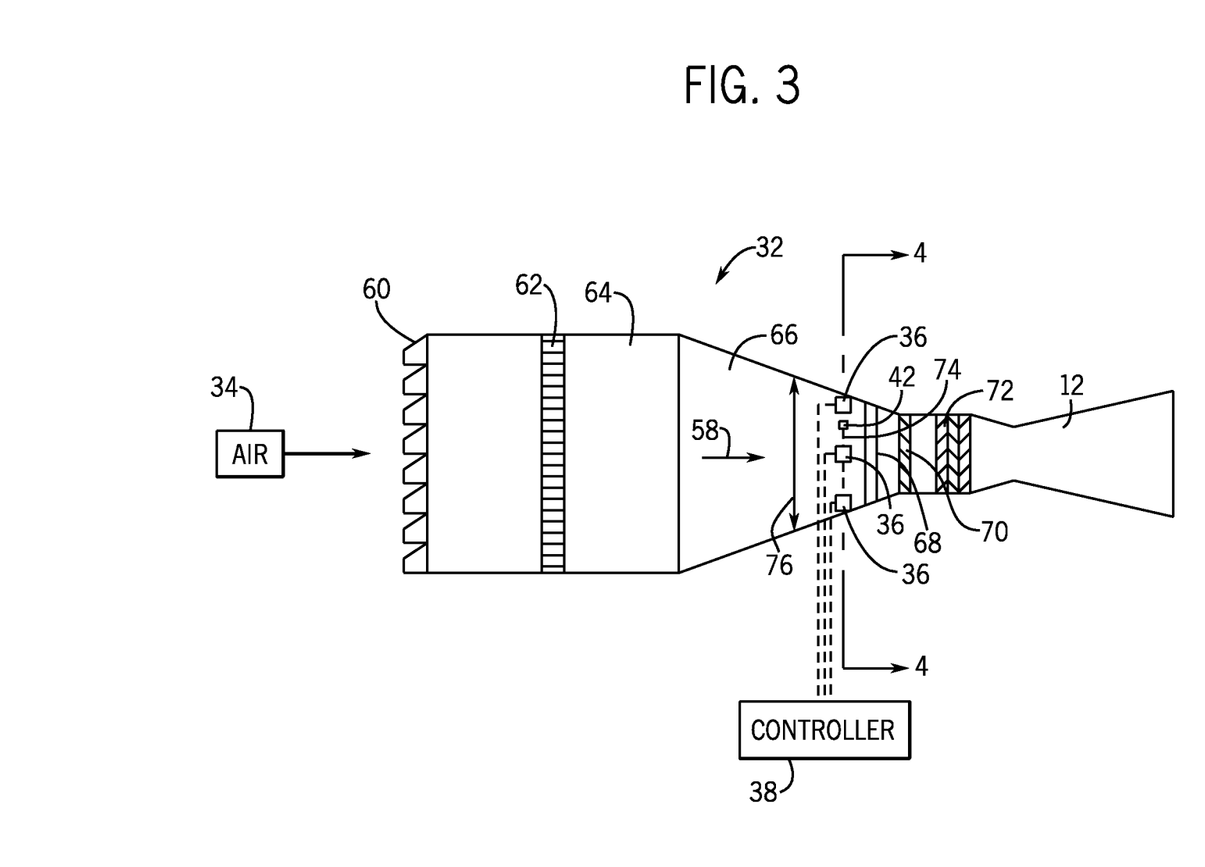
FIG. 3 is a schematic diagram of an embodiment of a gas turbine system including an ice detection system, in accordance with the present disclosure.

FIG. 3 is a schematic diagram of an embodiment of the gas turbine system 10 including the ice detection system 11 in accordance with the present disclosure. As illustrated, the ice detection system 11 may include multiple cameras 36 and one or more ice detectors 42. The cameras 36 and ice detectors 42 may be disposed in the air intake system 32 and communicatively coupled to the controller 38. The ambient air 34 may be supplied to the gas turbine system 10 via the air intake system 32. The air intake system 32 may include several sections that clean the air 34 and deliver the air 34 (e.g., along a direction 58) to the compressor 12. The components of the air intake system 32 may include a weather hood 60, one or more filters 62, a plenum chamber 64, a bellmouth 66, struts 68, and inlet guide vanes (IGVs) 70.

As a first barrier, the weather hood 60 and the filters 62 may block precipitate icing, dust, and debris from entering through the air intake system 32. The weather hood 60 may protect the filters 62 from effects of external environment (e.g., rain, sun) and may facilitate minimizing the amount of precipitate icing, dust, and debris drawn into the filters 62. Precipitate icing is water either in the form of liquid or solid that is present in the atmosphere. For example, precipitate icing includes hail, ice crystals, snow, freezing rain, ice fog and super cooled water droplets. Most forms of precipitate icing may be blocked or filtered out through the use of the weather hood 60 and the filters 62. Condensate icing, on the other hand, does not exist as an atmospheric condition and thus may not be blocked by the weather hood 60 or the filters 62. Condensate icing may include hoarfrost, rime ice, and glaze ice, which vary by severity and hardness.

Condensate icing may result in certain conditions of the air 34, such as cold ambient temperature and high humidity. The ice (e.g., condensate icing) may form at various locations of the gas turbine system 10, especially about the filters 62, the bellmouth 66, the struts 68, the inlet guide vanes (IGVs) 70, and a first stage 72 of the compressor 12. More particularly, due to temperature depression at the bellmouth 66 caused by flow acceleration of the air 34 into the compressor 12, the temperature of the air 34 at the bellmouth 66 may be lower than the temperature of the air 34 entering the air intake system 32. As a result, it may be more likely that the ice may form at the bellmouth 66 than at any other locations of the gas turbine system 10. Accordingly, in the illustrated embodiment, the multiple cameras 36 and the one or more ice detectors 42 are disposed in the air intake system 32 at the bellmouth 66 to detect or monitor actual ice formation. More specifically, the multiple cameras 36 and the one or more ice detectors 42 may be disposed about a portion of the bellmouth 66 that is relatively closer to the compressor 12 (e.g., about the struts 68 and the IGVs 70). However, it should be noted, the multiple cameras 36 and the one or more ice detectors 42 may be disposed in any suitable locations of the gas turbine system 10, including, but not limited to, the filters 62, the struts 68, the inlet guide vanes (IGVs) 70, and a first stage 72 of the compressor 12.

While in the illustrated embodiment, the multiple cameras 36 and the one or more ice detectors 42 are disposed around a periphery or perimeter (e.g., an axial position along the direction 58), such as a first periphery 74, of the bellmouth 66, each of the multiple cameras 36 and each of the one or more ice detectors 42 may be distributed in any suitable manner along the bellmouth 66, including circumferentially around its periphery, axially along its periphery (e.g., along the direction 58), or in any other suitable arrangement. For example, any one of the multiple cameras 36 and/or any one of the ice detectors 42 may be disposed around one or more other peripheries (e.g., a second periphery 76) of the bellmouth 46. The multiple cameras 36 (as well as the one or more ice detectors 42) may be disposed at one, two, three, or more axial locations (e.g., along the direction 58) of the bellmouth 66. In addition, where multiple cameras 36 (as well as the one or more ice detectors 42) are disposed around a perimeter or periphery (e.g., circumference) of the bellmouth 66, the cameras 36 may be spaced substantially evenly or unevenly from one another. Also, where multiple cameras 36 are disposed at multiple axial locations of the bellmouth 66, the cameras 36 may be in-line and/or staggered with respect to one another. For example, the cameras 36 may be positioned at different radial locations when viewed along the direction 58. Such configurations may be desirable, for example, to position the cameras 36 in a manner that provides maximal imaging coverage areas of the bellmouth 66 (e.g., circumferentially around its peripheries and axially along its peripheries).

Figure 4:
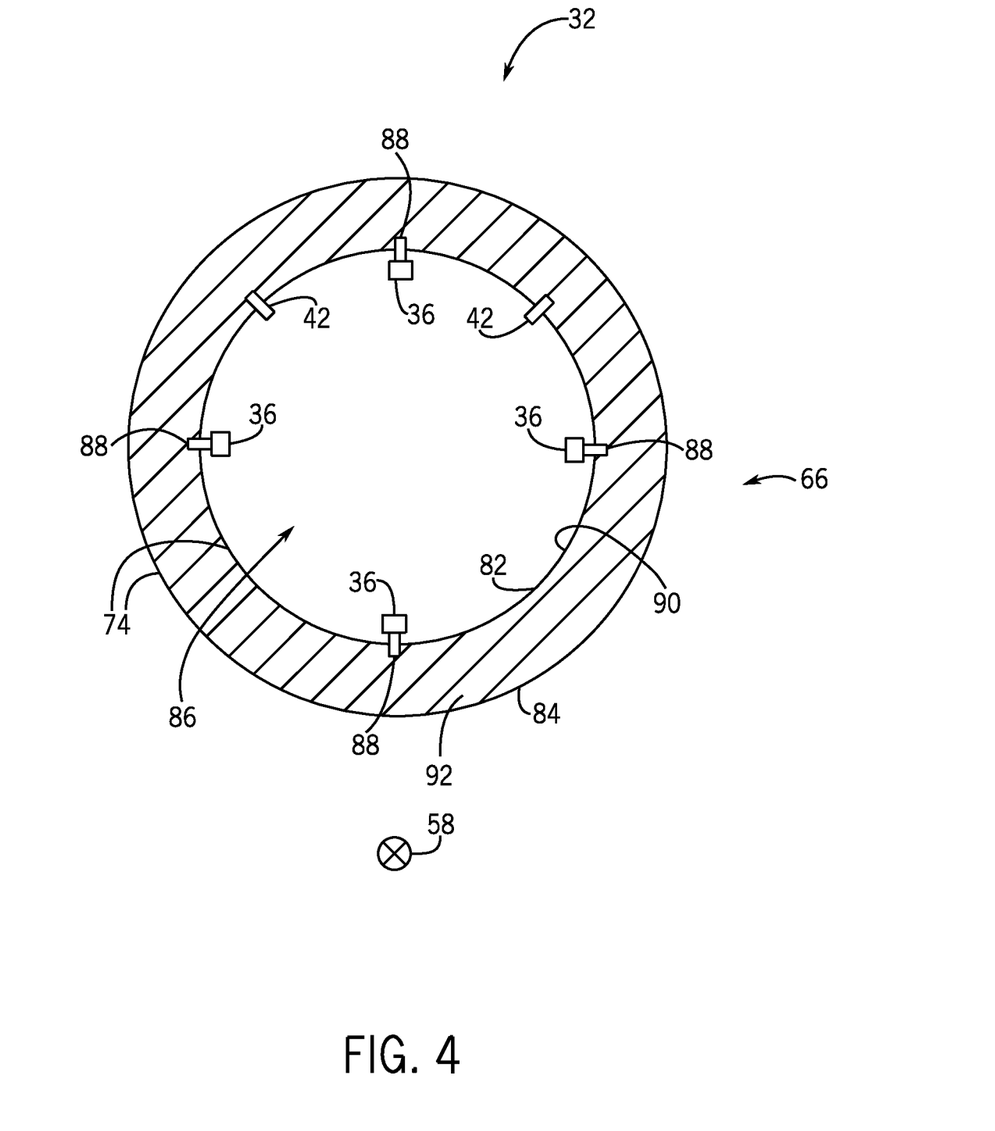
FIG. 4 is a cross-sectional view of the gas turbine system including the ice detection system of FIG. 3, in accordance with the present disclosure.

FIG. 4 illustrates a cross section (e.g., along line 4-4 in FIG. 3) of the bellmouth 66 where multiple cameras 36 and ice detectors 42 are disposed. More specifically, the cross section of the bellmouth 66 axially along the periphery 74 of the bellmouth 66. As illustrated in FIG. 4, the periphery 74 is substantially circular. However, it should be noted that the periphery 74 of the bellmouth 66 may be in any shape, including, but not limited to, oval, square, triangle, rectangle, or any combination thereof.

The bellmouth 66 may include an interior wall 82 and an exterior wall 84. The interior wall 82 may substantially enclose an air passage 86 (e.g., inlet), through which the air 34 may flow through the air intake system 32 into the compressor 12. As noted above, ice (e.g., condensate icing) may form on the interior wall 82. In the illustrated embodiment, four cameras 36 are disposed in the interior wall 82 of the bellmouth 66, circumferentially spaced from one another substantially evenly around the periphery 74. Each camera 36 may be coupled to the interior wall 82 via a mount 88, which may be disposed onto (or through) the interior wall 82 in any suitable manner (e.g., via screws, adhesive, or the like). Each camera 36 may image a certain area of an inner surface 90 of the interior wall 82 of the bellmouth 66. For example, in the illustrated embodiment, each of the four cameras 36 may image about 25% of the inner surface 90 of the interior wall 82, and therefore, the four cameras 36 may substantially image all of the inner surface area of the interior wall 82. However, as noted above, the ice detection system may include any suitable number of the cameras 36, and accordingly, each camera may image any suitable amount of surface area of the inner surface 90. In addition, the one or more cameras 36 may in combination cover all or a part of the total surface area of the inner surface 90. Furthermore, each of the cameras 36 may include any suitable features, such as a zoom lens, a variable aperture, a movable imaging head, a movable mount 88, and the like, to facilitate imaging (e.g., changing imaging coverage area, changing image brightness, clarity, resolution, and the like).

Also as illustrated, two ice detectors 42 are disposed on the inner wall 82 of the bellmouth 66. As noted above, the ice detectors 42 may be disposed on inner wall 82 in any suitable manner relatively to the cameras 36. The cameras 36 and the ice detectors 42 may be communicatively coupled to the controller 38 and the power source 56 through wired and/or wireless communication devices (e.g., cables, data lines, wireless routers, and the like), which may be disposed in space 92 between the interior all 82 and the exterior wall 84.

The images obtained by the cameras 36 may be transmitted to the controller 38 (e.g., the processor 42) for processing to determine actual ice formation, if any, with any suitable algorithms or methods, such as edge detection and analysis.

FIGS. 5-8 illustrate an embodiment of a technique 100 for detection of actual ice formation from multiple images (e.g., a first image 102, a second image 104, a third image 106, and a fourth image 108) at various times (e.g., a first time t1, a second time t2, a third time t3, and a fourth time t4, respectively). It should be noted that the images 102, 104, 106, 108 are shown for illustrative purposes, and may be only a portion of all the images obtained by one of the cameras 36.

To compare the images (e.g., the images 102, 104, 106, 108) collected at different times (e.g., the times t1, t2, t3, t4) with one another, the images may include one or more reference fiducial markers. The reference fiducial marker may be an image of any suitable object on, in, coupled to, integrated with, or otherwise associated to the bellmouth 66 (e.g., the inner surface 90), such as a physical marker (e.g., an ink spot), or a structural element (e.g., a screw, a beam, a conduit, a connection, or the like) of the bellmouth 66. The physical maker or the structural element may be in close proximity of the inner surface 90 such that the reference fiducial marker may be positioned simultaneously in an image with a portion of the inner surface 90 imaged by one of the cameras 36. By way of example, the images 102, 104, 106, 108, as illustrated in FIGS. 5-8, all include the same two reference fiducial markers, a star 110 corresponding to a star marker on the inner surface 90, and a substantially rectangular shape 112 corresponding to a rectangular beam disposed on the inner surface 90.

Figure 5:
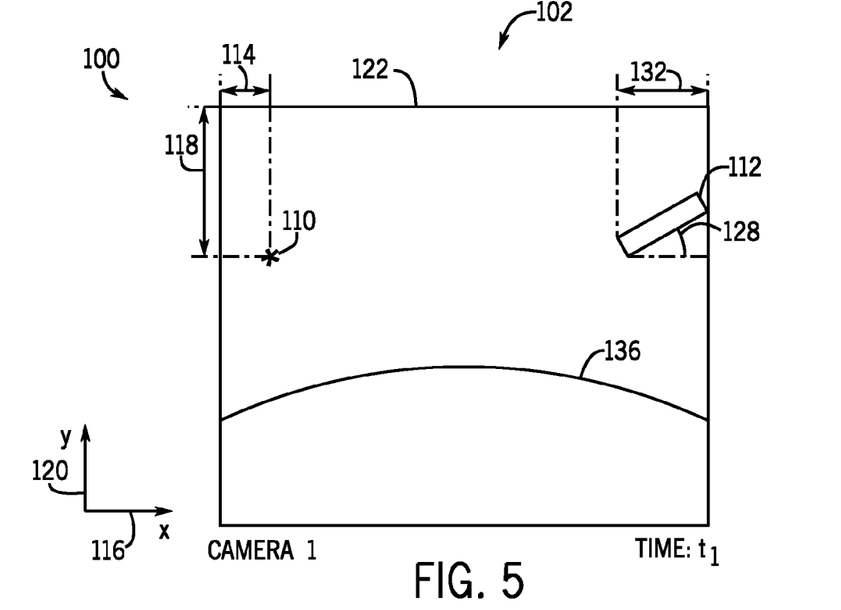
FIG. 5 is an embodiment of an image obtained by the ice detection system of FIG. 3, in accordance with the present disclosure.
Figure 6:
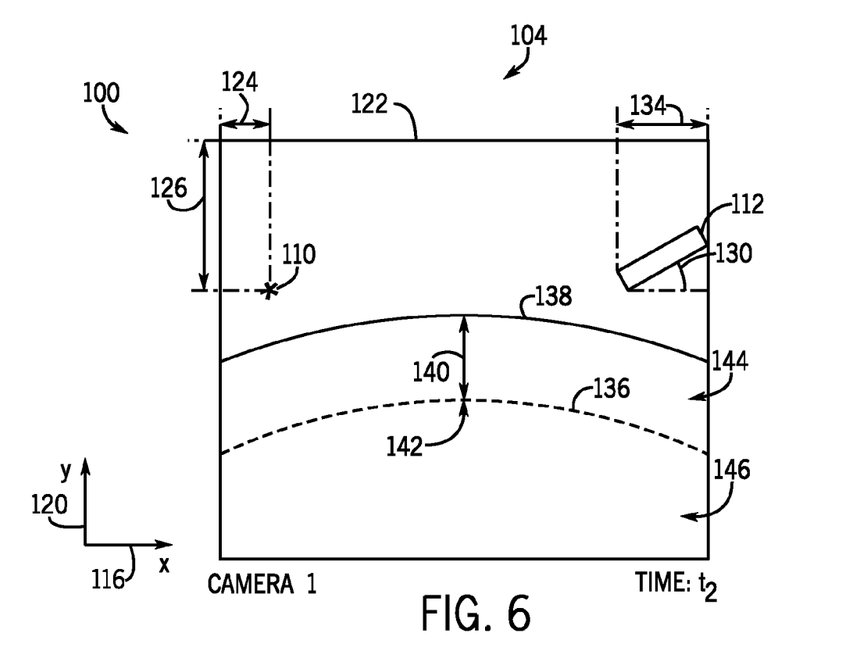
FIG. 6 is an embodiment of an image obtained by the ice detection system of FIG. 3, in accordance with the present disclosure.

Using the one or more reference fiducial markers, the multiple images (e.g., the images 102, 104, 106, 108) may be aligned (e.g., corrected for image shift over time) with one another for comparison. For example, the star 110 in the first image 102 has a first width 114 (e.g., along an X-axis 116) and a first length 118 (e.g., along a Y-axis 120), respectively, relative to an upper-left corner point 122. When other images 104, 106, 108 are obtained by the same camera 36 in substantially the same manner (e.g., with the same imaging angle, same focal length, and the like), the position of the star 110 (e.g., relative to the upper-left corner point 122) remains the same as with the image 102. As a specific example, in the second image 104, the star 110 in the image 102 may have a second width 124 and a second length 126, respectively, relative to the upper-left corner point 122. Accordingly, the second image 104 may be shifted such that the second width 124 is substantially equal to the first width 114, and the second length 126 is substantially equal to the first length 118, thereby aligning the first image 102 with the second image 104.

The shape 112 in all the images 102, 104, 106, 108 may also be used similarly as the star 110 for image alignment (e.g., relative to the upper-left corner point 122 to correct planar shift among the images). In addition, the shape 112 may be used for image alignment based on the size and/or angle of the shape 112. As an example, in the first image 102, the shape 112 has a first angle 128 relative to the X-axis 116, and in the second image 104, the shape 112 may have a second angle 130 relative to the X-axis 116. By rotating the second image 104 such that the second angle 130 is substantially equal to the first angle 128, the second image 104 may be aligned with first image 102, corrected for angular shift. As another example, in the first image 102, the shape 112 has a first width 132 along the X-axis 116, and in the second image 104, the shape 112 may have a second width 134 along the X-axis 116. By enlarging or reducing the size of the second image 104 such that the second width 134 is substantially equal to the first width 132, the second image 104 may be aligned with first image 102, corrected for size difference (e.g., due to changing of the focal length). Other images 106, 108 may be similarly adjusted as the second image 104 to align with the first image 102 (e.g., for correction of size difference and/or angular shift of the images). Although as described above, the first image 102 is used as the reference image, any of the images (e.g., the images 104, 106, 108) obtained by the camera 36 may be used as the reference image for image alignment.

Once the images (e.g., the images 102, 104, 106, 108) are aligned, they can be compared with one another. As a specific example, the first image 102 illustrates a first line 136, denoting a portion of the inner surface 90 at time t1 without any actual ice formation thereon. During operation, for example, at time t2, the second image 104 shows a second line 138 that is in a different location than the first line 136. For example, the second line 138 is closer to the star 110 and the shape 112 compared to the first line 136, which may suggest formation of actual ice (e.g., with a thickness 140 in the Y-axis 120) at a point 142 of the inner surface 90. In other words, controller 38 may determine that there has been actual ice formed because the difference between the second line 138 and the first line 136 is above a certain threshold (e.g., the position change relative to the star 110 and/or the shape 112). The threshold (e.g., icing threshold) on the images may depend on the amount (e.g., thickness) of the actual ice formed on the inner surface 90, the characteristics of the cameras 36 (e.g., focal length, viewing angle, and the like), and imaging processing methods (e.g., size magnification, size reduction, and the like). Each camera 36 may be calibrated to establish a relationship between the actual dimension (e.g., thickness) of an object (e.g., ice, structural elements of the air intake system 32) and its dimension on the images. The actual icing threshold (e.g., thickness of ice actually formed) may be between approximately 0.001 m and 1 m, such as between approximately 0.005 m and 0.5 m, between approximately 0.01 m and 0.1 m, between approximately 0.02 m and 0.09 m, between approximately 0.04 m and 0.07 m, or between approximately 0.05 m and 0.06 m. In addition, an area 144 between the first line 136 and the second line 138 may have different characteristics, such as color, hue, brightness, contrast, and the like, from an area 146 below the first line 136. Accordingly, these characteristics may be used to confirm the actual ice formation and/or determine features (e.g., type) of the formed ice.

Figure 7:
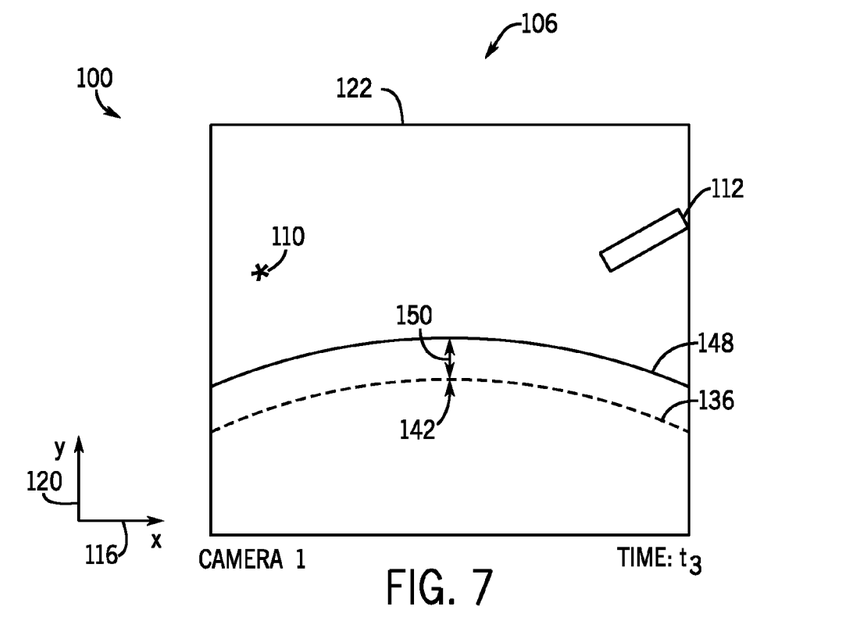
FIG. 7 is an embodiment of an image obtained by the ice detection system of FIG. 3, in accordance with the present disclosure.

When it is determined (e.g., from comparing the second image 104 with the first image 102) that actual ice is formed on the inner surface 90, the controller 38 may control the anti-icing system 40 to operate to reduce or eliminate the ice. For example, the third image 106 illustrates a third line 148 that is further away from the star 110 and the shape 112 compared to the second image 104. This may reflect that at time t3, after the antic-icing system 40 has been in operation for a certain period of time, the ice is reduced (e.g., with a thickness 150 smaller than the thickness 140 at the point 142). In some embodiments, the controller 38 may control the operations of the anti-icing system 40 based on the amount of the actual ice detected. For example, the controller 38 may increase or decrease power used by the anti-icing system 40 based on a change of thickness (e.g., from thickness 140 to 142) as a function of time (e.g., from time t2 to t3).

Figure 8:
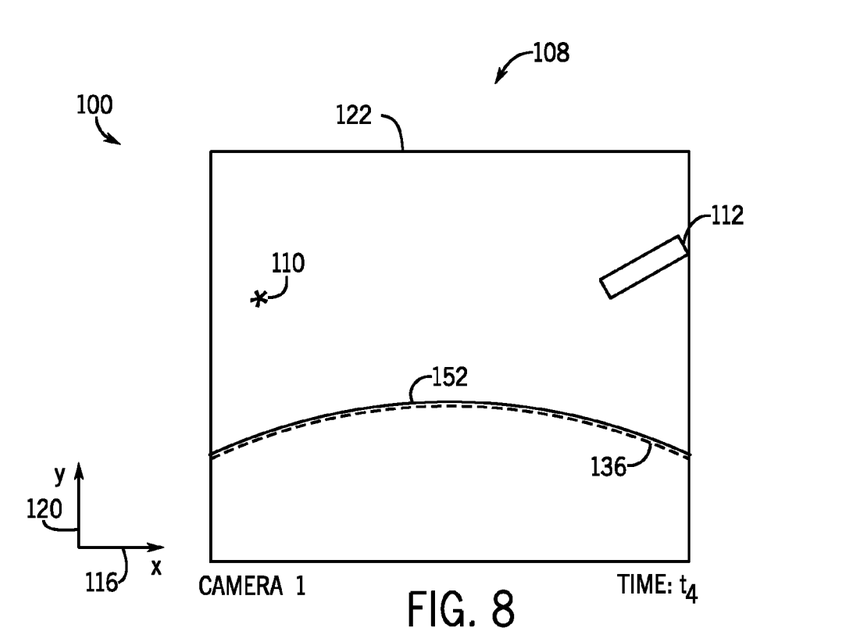
FIG. 8 is an embodiment of an image obtained by the ice detection system of FIG. 3, in accordance with the present disclosure.

When it is determined (e.g., from comparing the fourth image 108 with the third image 106) that the formed ice has been substantially eliminated, the controller 38 may control the anti-icing system 40 to stop operation. For example, the fourth image 108 illustrates a fourth line 152 that substantially overlaps with the first line 136. This may reflect that at time t4, the ice is substantially eliminated. In the technique 100 as described above, all the lines (e.g., the lines 136, 138, 148, 152, and outlines or contours of the star 110 and the shape 112) may be detected and monitored by an operator. In some embodiments, the controller 38 automatically detects and monitors the lines 136, 138, 148, 152 with any suitable methods (e.g., edge detection).

Figure 9:
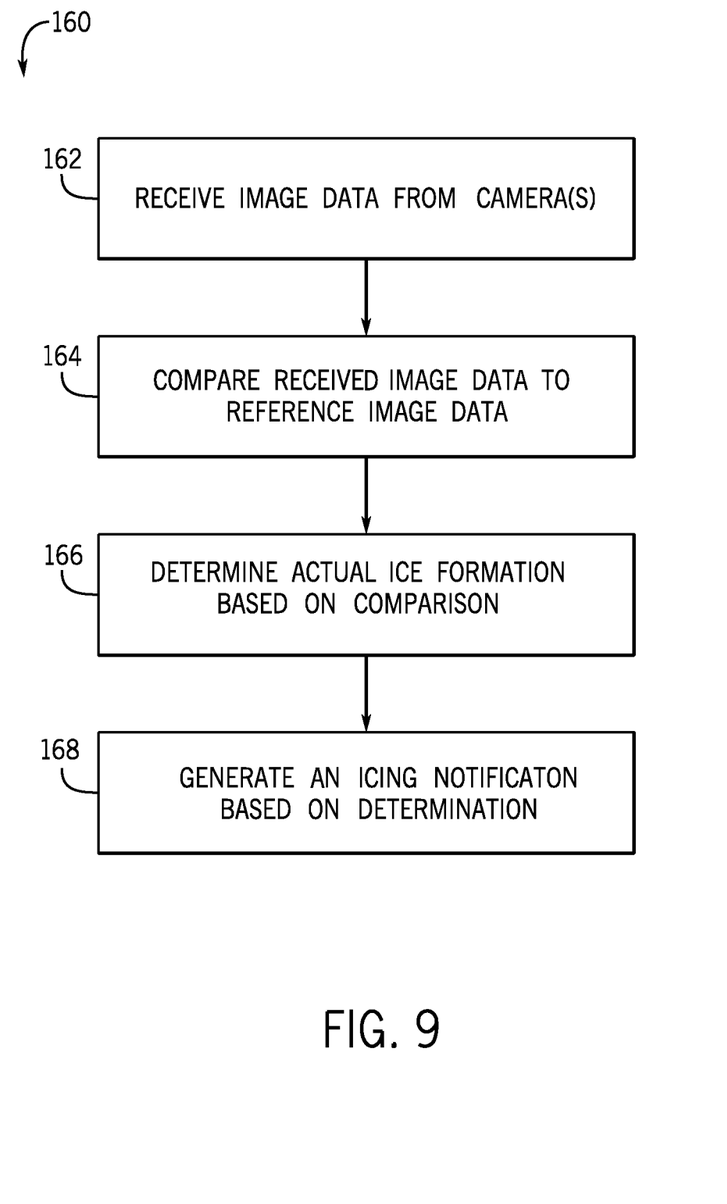
FIG. 9 is an embodiment of a method for ice detection, in accordance with the present disclosure.

FIG. 9 is a flow diagram of an embodiment of a method 160 for actual ice detection in accordance with the present disclosure. The method 160 may be performed by the components described above (e.g., the ice detection system 11 including the cameras 36, the controller 38, and the anti-icing system 40). In the illustrated embodiment, the method 160 includes receiving (block 162) image data from a camera 36. The camera 36 may be disposed at various locations of the gas turbine system 10, especially at the air intake system 32 (e.g., the bellmouth 66). The image data may correspond to the air passage 86 (e.g., inlet) and/or the inner surface 90 of the bellmouth 66. The image data may include multiple separate images obtained at different times. The image data along with any related data obtained by the camera 36 may be transmitted to the controller 38 for processing.

The controller 38 may compare (block 164) the received image data to reference image data. The reference image data may include any images obtained by the camera 36 when the air intake system 32 (or any other locations where the camera 36 is disposed) is free of actual ice formation. The received image data and the reference image data may be aligned before comparison. As discussed above, the alignment of the images may include using one or more reference fiducial markers to correct the image shifts due to planar movements, angular rotations, and/or size changes. The controller 38 may utilize any suitable algorithms and techniques for image comparison, including edge detection.

Based on the comparison, the controller 38 may determine (block 166) whether there is actual ice formed in the air intake system 32 (or any other locations where the camera 36 is disposed). The determination may be based on changes of the edges (e.g., surface lines 136, 138, 148, 152) among the images above a certain threshold (e.g., in distance relative to one or more reference fiducial markers). The determination may also be based on other characteristics of the images, such as color, hue, brightness, contrast, and the like. The controller 38 may also determine the amount (e.g., thickness) of ice formed based on the images.

Based on the determination, the controller 38 may generate (block 168) an icing notification. The notification may include whether there has been actual ice formed in the detection location, and if so, the amount of ice formed. The notification may be provided to an operator (e.g., via the display 48) so that the operator may take appropriate actions (e.g., stop the gas turbine system 10, start the anti-icing system 40). The notification may include an audio and/or visual indication (e.g., a number, message, voice, alarm, or any combination thereof). Additionally or alternatively, the controller 38 may, based on the notification, automatically adjust the operations of the gas turbine system 10 (e.g., stop the gas turbine system 10, start the anti-icing system 40). The controller 38 may control the operations of the anti-icing system 40 based on the amount of the ice formed in the gas turbine system 10.

Technical effects of the disclosure include an ice detection system 11 using one or more cameras 36 for detection actual ice formation in the gas turbine system 10. The images obtained by the one or more cameras 36 may be processed by the controller 38 of the ice detection system 11 to determine whether there is actual ice formed in the locations where the one or more cameras 36 are disposed. Based on the determination, the control system 38 may control the anti-icing system 40 to reduce or eliminate the ice. Because the anti-icing system 40 may operate only when actual ice formation are detected, parasitic loss of engine power and/or auxiliary power may be reduced, and performance of the gas turbine system 10 and/or plant may be improved.

This written description uses examples to disclose the embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
receiving image data from a camera coupled to an air intake system of a gas turbine engine, wherein the image data corresponds to an air passage of the air intake system;
comparing the received image data to reference image data of the air intake system; and
generating an icing notification based at least in part on the comparison when a difference between the received image data and reference image data is greater than an icing threshold.

2. The method of claim 1, wherein the difference is greater than the icing threshold when the comparison indicates a threshold amount of ice accumulation on at least a portion of the air passage of the air intake system.

3. The method of claim 1, wherein comparing the received image data to the reference image data comprises matching reference fiducial markers of the reference image data to received fiducial markers of the received image data.

4. The method of claim 1, wherein comparing the received image data to the reference image data comprises:
determining a first edge of the air passage of the reference image data;
determining a second edge of the air passage of the received image data; and
comparing the first edge to the second edge.

5. The method of claim 1, comprising controlling an air flow through the air passage based at least in part on the icing notification, wherein controlling the air flow comprises heating the air flow, bleeding a portion of the air flow from the air intake system, shutting down the air intake system, or any combination thereof.

6. The method of claim 5, comprising controlling the air flow through the air passage automatically based at least in part on the icing notification.

7. The method of claim 1, wherein the gas turbine engine comprises a compressor coupled to air intake system.

8. The method of claim 1, wherein the icing notification is based at least in part on icing data received from an ice detector coupled to the air passage.

9. The method of claim 1, wherein the icing notification comprises an audible notification, a visual notification, or any combination thereof.

10. The method of claim 1, wherein the received image data and the reference image data correspond to a bellmouth of the air intake system.

11. A system comprising:
a controller, comprising:
one or more tangible, non-transitory, machine-readable media collectively storing one or more sets of instructions; and
one or more processing devices configured to execute the one or more sets of instructions to:
receive image data from a camera coupled to an air intake system of a gas turbine engine, wherein the image data corresponds to an air passage of the air intake system;
compare the received image data to reference image data of the air intake system; and
generate an icing notification based at least in part on the comparison when a difference between the received image data and reference image data is greater than an icing threshold.

12. The system of claim 11, wherein the difference is greater than the icing threshold when the comparison indicates a threshold amount of ice accumulation on at least a portion of the air passage of the air intake system.

13. The system of claim 11, wherein the one or more processing devices are configured to execute the one or more sets of instructions to match reference fiducial markers of the reference image data to received fiducial markers of the received image data.

14. The system of claim 11, wherein the one or more processing devices are configured to:
determine a first edge of the air passage of the reference image data;
determine a second edge of the air passage of the received image data; and
compare the first edge to the second edge.

15. The system of claim 11, wherein the one or more processing devices are configured to control an air flow through the air passage based at least in part on the icing notification, wherein to control the air flow comprises to heat the air flow, to bleed a portion of the air flow from the air intake system, to shut down the air intake system, or any combination thereof.

16. The system of claim 11, wherein the one or more processing devices are configured to receive icing data from an ice detector coupled to the air passage and to generate the icing notification based at least in part on the icing data.

17. A system comprising:
a gas turbine engine comprising an air intake system, the air intake system comprising an air passage;
a camera coupled to the air intake system and configured to image the air passage of the air intake system; and
a controller communicatively coupled to the camera and configured to:
receive image data from the camera, wherein the image data corresponds to the air passage;
compare the received image data to reference image data of the air intake system; and
generate an icing notification based at least in part on the comparison when a difference between the received image data and reference image data is greater than an icing threshold.

18. The system of claim 17, wherein the controller is configured to match reference fiducial markers of the reference image data to received fiducial markers of the received image data.

19. The system of claim 17, wherein the controller is configured to control an air flow through the air passage based at least in part on the icing notification, wherein to control the air flow comprises to heat the air flow, to bleed a portion of the air flow from the air intake system, to shut down the air intake system, or any combination thereof.

20. The system of claim 17, comprising an ice detector coupled to the air passage, and wherein the controller is configured to receive icing data from the ice detector and to generate the icing notification based at least in part on the icing data.

* * * * *